United States Patent
Clark

(10) Patent No.: US 10,730,347 B2
(45) Date of Patent: Aug. 4, 2020

(54) TIRE INNERLINER WITH CARBON BLACK BLEND

(71) Applicant: BRIDGESTONE AMERICAS TIRE OPERATIONS, LLC, Nashville, TN (US)

(72) Inventor: Melissa M. Clark, Woodland Park, CO (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/275,760

(22) Filed: Feb. 14, 2019

(65) Prior Publication Data

US 2019/0176519 A1   Jun. 13, 2019

Related U.S. Application Data

(63) Continuation of application No. 15/029,173, filed as application No. PCT/US2014/060935 on Oct. 16, 2014, now abandoned.

(60) Provisional application No. 61/892,228, filed on Oct. 17, 2013.

(51) Int. Cl.
| | |
|---|---|
| *B60C 1/00* | (2006.01) |
| *B60C 5/14* | (2006.01) |
| *C08K 3/04* | (2006.01) |
| *C08K 3/34* | (2006.01) |

(52) U.S. Cl.
CPC .............. *B60C 1/0008* (2013.01); *B60C 5/14* (2013.01); *C08K 3/04* (2013.01); *C08K 3/346* (2013.01); *B60C 2200/06* (2013.01); *C08K 2201/005* (2013.01); *C08K 2201/006* (2013.01); *C08K 2201/014* (2013.01)

(58) Field of Classification Search
CPC .................................................... B60C 1/0008
See application file for complete search history.

(56) References Cited

U.S. PATENT DOCUMENTS

| | | | |
|---|---|---|---|
| 3,143,449 A * | 8/1964 | Bosomworth | B29D 30/0602 156/126 |
| 3,223,134 A | 12/1965 | Hofmann | |
| 3,769,122 A | 10/1973 | Coddington et al. | |
| 5,576,373 A | 11/1996 | Kresge et al. | |
| 5,798,405 A | 8/1998 | Zimmer et al. | |
| 5,922,153 A | 7/1999 | Beers et al. | |
| 8,399,550 B2 | 3/2013 | Hogan et al. | |

(Continued)

FOREIGN PATENT DOCUMENTS

| | | |
|---|---|---|
| JP | 2006249147 A | 9/2006 |
| JP | 2007277490 A | 10/2007 |
| JP | 2011057940 A | 3/2011 |

OTHER PUBLICATIONS

International Search Report for Application No. PCT/US2014/060935 dated Jan. 29, 2015, 12 pgs.

(Continued)

*Primary Examiner* — Liam J Heincer
(74) *Attorney, Agent, or Firm* — Meredith E. Hooker; Arthur M. Reginelli

(57) ABSTRACT

A tire comprising an innerliner, where the innerliner includes a rubber, a first carbon black having a statistical thickness surface area of at least 50 $m^2/g$, and a second carbon black having a statistical thickness surface area of at most 45 $m^2/g$.

15 Claims, 1 Drawing Sheet

(56) References Cited

U.S. PATENT DOCUMENTS

| | | |
|---|---|---|
| 2006/0205858 A1 | 9/2006 | Hirayama |
| 2009/0114328 A1 | 5/2009 | Takahashi et al. |
| 2011/0015303 A1 | 1/2011 | Joseph et al. |
| 2011/0094645 A1 | 4/2011 | Rodgers et al. |
| 2011/0178235 A1 | 7/2011 | Sugimoto |
| 2011/0190417 A1 | 8/2011 | Muller-Wilke |
| 2011/0198010 A1 | 8/2011 | Voge et al. |
| 2013/0139940 A1 | 6/2013 | Ito et al. |
| 2013/0199686 A1 | 8/2013 | Chung et al. |
| 2014/0007999 A1 | 1/2014 | Yanai |
| 2015/0368451 A1 | 12/2015 | Forte |

OTHER PUBLICATIONS

Cancarb (Medium Thermal Black N990 in Low Voltage Wire and Cable Insulation, Aug. 1997) 8 pgs.
Wampler, et al. (Carbon Black, Rubber Compounding: Chemistry and Applications, Taylor and Francis, 2004) 46 pgs.

\* cited by examiner

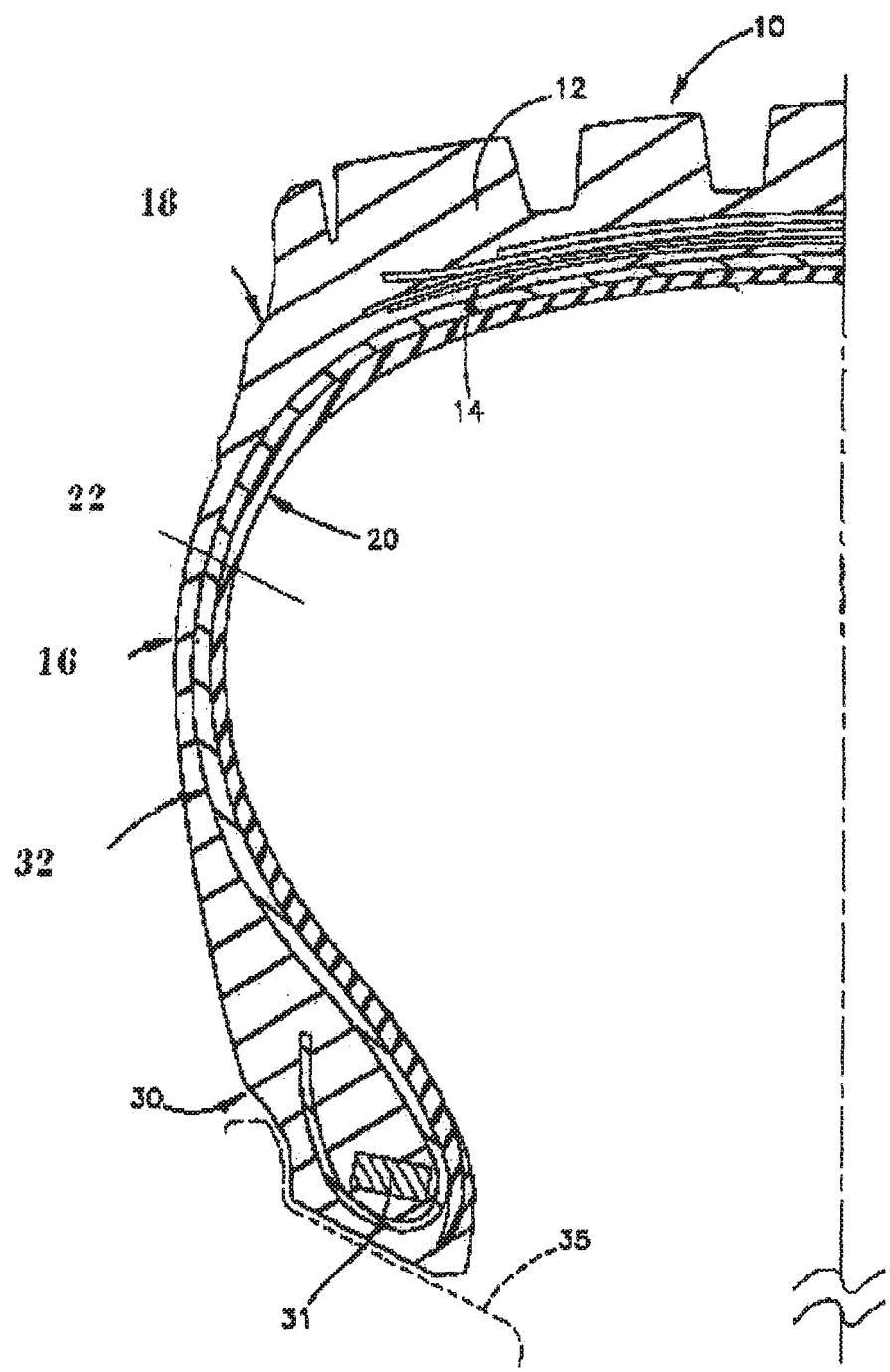

TIRE INNERLINER WITH CARBON BLACK BLEND

This application is a continuation application of U.S. application Ser. No. 15/029,173, filed on Apr. 13, 2016, which is a national-stage application of PCT/US2014/060935, filed on Oct. 16, 2014, which claims the benefit of Provisional Application Ser. No. 61/892,228, filed on Oct. 17, 2013, all of which are incorporated herein by reference.

FIELD OF THE INVENTION

Embodiments of the invention are directed toward a tire innerliner prepared with a blend of distinct carbon black fillers.

BACKGROUND OF THE INVENTION

The inner surface of a pneumatic tire may include an elastomeric composition designed to prevent or retard the permeation of air from the inner air chamber of the tire. This elastomeric composition is often referred to as an innerliner. Rubbers, such as butyl and halobutyl rubber, which are relatively impermeable to air, are often used as the primary rubber component in innerliners.

The innerliner is generally a relatively thin sheet of elastomer that is formulated with compounding additives and a curing system. This thin sheet is laminated to the inner surface of a tire carcass layer of an uncured tire as the tire is formed on a tire building drum. Final cure of the composite structure produces a tire having a cured innerliner adhered to the carcass.

Properties that are desirable for innerliners include good resistance to air permeation, flex resistance, and adhesion to the tire carcass. It is also desirable that the green innerliner have sufficient green strength to prevent damage (e.g., tears) during tire construction. Low permeability to air is generally achieved through the use of a high mechanical Tg polymer, such as butyl rubber or a halobutyl rubber. The high Tg polymer may be blended with other elastomers such as SBR or natural rubber. Flex resistance and tensile strength depends, to some degree, on modulus.

While the strength of rubber compositions has historically been improved through the use of reinforcing carbon black, recent developments have found that layered minerals, such as layered silicates (also referred to as clays), can be used as filler materials within innerliner rubber compositions to improve resistance to air permeation and allow for the use of thinner gauge innerliners. For example, a portion of the carbon black volume within an innerliner composition can be replaced with the layered silicate to achieve these advantageous results.

While thinner gauge innerliners have proven to be advantageous, they present manufacturing challenges because green strength is diminished at thinner gauges, and therefore tears and other damage to the innerliner can be problematic at these thinner gauges.

With continued demands on innerliners and production of tires using thinner innerliners, there is a continued need to improve upon this area of technology.

BRIEF DESCRIPTION OF THE DRAWINGS

The FIGURE is a fragmented sectional view of a tire according to embodiments of the invention.

SUMMARY OF THE INVENTION

One or more embodiments of the present invention provide a tire comprising an innerliner, where the innerliner includes a rubber, a first carbon black having a statistical thickness surface area of at least 50 $m^2/g$, and a second carbon black having a statistical thickness surface area of at most 45 $m^2/g$.

Still other embodiments of the present invention provide a tire comprising an innerliner, where the innerliner includes a rubber, a first carbon black having an average particle size of less than 40 nm, and a second carbon black having an average particle size of greater than 40 nm.

DETAILED DESCRIPTION OF ILLUSTRATIVE EMBODIMENTS

Embodiments of the invention are based, at least in part, on the discovery of an innerliner that includes a blend of distinct carbon black particles. It has unexpectedly been discovered that the blend of carbon black particles provides the innerliner with increased green strength. As a result, embodiments of the invention are directed toward relatively thin innerliners, including those that are filled with clays, that have advantageous green strength and thereby overcome issues encountered in the prior art. Embodiments of the invention are directed toward tires prepared with the innerliners described herein.

Tire Construction

An example of a tire according to embodiments of the invention is shown in the FIGURE. Tire 10 includes a tread portion 12, a belt package 14, sidewalls 16, shoulder portion 18, innerliner ply 20, cavity 22, and bead portions 30 that include bead core 31. Carcass 32 extends between bead portions 30. Bead cores 31 help to hold bead portions 30 against vehicle rim 35.

Practice of the present invention does not necessarily impact the thickness of the innerliner. In one embodiment, the innerliner of the present invention has an uncured gum thickness in the range of from about 0.02 to about 0.5 cm, in other embodiments from about 0.03 to about 0.45 cm, in other embodiments from about 0.04 to about 0.40 cm, in other embodiments from about 0.05 to about 0.20 cm, and in other embodiments from about 0.08 to about 0.15 cm.

In particular embodiments, the green innerliner prepared according to the present invention is relatively thin. For example, in one or more embodiments, the green innerliner may have a thickness that is less than 0.25 cm, in other embodiments less than 0.20 cm, and in other embodiments less than 0.10 cm, wherein the thickness may range from 0.05 to 0.25 cm.

Innerliner Composition

In one or more embodiments, a vulcanizable innerliner composition is employed to prepare a green tire innerliner. As will be discussed in greater detail below, this green innerliner is employed to build a green tire that is ultimately cured. In one or more embodiments, the vulcanizable innerliner composition also includes a rubber component, a first carbon black filler, a second carbon black filler, and a curative. In particular embodiments, the vulcanizable innerliner composition also includes a clay filler. In other embodiments, the vulcanizable innerliner composition also includes other components that are commonly employed in the art of making vulcanizable innerliner compositions.

Rubber Components

In one or more embodiments, the rubber component of the vulcanizable innerliner composition may include one or more polymers that are capable of being crosslinked or vulcanized; these polymers may be referred to as rubbery polymers or elastomers. In one or more embodiments, the rubbery polymers are selected based upon their properties of low permeability to gases, good vibration damping, good heat, chemical, ozone, and oxidation resistance. In one or more embodiments, the vulcanizable innerliner compositions may include isobutylene-based elastomers. These elastomers may be used alone or in conjunction with other elastomers. The other elastomers may include natural and synthetic elastomers.

Isobutylene-based elastomers include polyisobutylene homopolymers, isobutylene/isoprene copolymers, and halogenated derivatives thereof. Iso-butylene-based elastomers further include halogenated isobutylene-p-methylstyrene copolymers. Iso-butylene-based elastomers and their halogenated derivatives are sometimes referred to as "butyl rubber" and "halobutyl rubber," respectively.

Commercially available butyl rubber includes poly(methylpropene-co-2-methyl-1,3 butadiene) and poly(isobutylene-co-isoprene).

In one or more embodiments, the butyl rubber is prepared by copolymerizing butylene and isoprene. The relative amounts of these monomers will determine the mole percent unsaturation of the resulting copolymer. In other words, the mole percent of isoprene in the copolymerization will correspond to the mole percent unsaturation in the copolymer. In one or more embodiments, the iso-butylene-based elastomer may have a mole percent unsaturation of less than about 3, in other embodiments, less than about 2.5, and in other embodiments, less than about 2.

Halobutyl rubber may include chlorobutyl rubber (CIIR), bromobutyl rubber (BIIR), or mixtures thereof. In one or more embodiments, the halobutyl rubber may include from about 0.5 to about 5 percent by weight halogen atom, in other embodiments from about 0.7 to about 4 percent by weight halogen atom, and in other embodiments from about 1 to about 3 percent by weight halogen atom, based upon the total weight of the halobutyl rubber.

In one or more embodiments, the vulcanizable innerliner compositions may include synthetic polymers such as, but not limited to, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, and epichlorohydrin rubber. In one or more embodiments, these synthetic polymers may be used alone as the rubber to form the rubber component of the vulcanizable composition. In other embodiments, they may be used together with the isobutylene-based rubber to form the rubber component of the vulcanizable composition. In other embodiments, the synthetic polymers may be used in conjunction with the isobutylene-based polymer and the natural rubber to form the rubber component of the vulcanizable composition.

Curative

The curative, which may also be referred to as a cure system, may include a multitude of rubber curing agents including, but not limited to, sulfur-based compounds, metal oxide, or peroxide-based curing systems. Vulcanizing agents may be used alone or in combination. Sulfur-based compounds include those compounds conventionally employed in the art of making tires. These compounds may also be referred to as sulfur or sulfur crosslinking agents. In one or more embodiments, sulfur includes free sulfur, which may also be referred to as elemental sulfur, as well as those compounds known in the art to be sulfur donor compounds (e.g. thiurams such as thiuram disulfide).

Curing agents are described in Kirk-Othmer, Encyclopedia of Chemical Technology, 365-468, (3rd Ed. 1982), particularly Vulcanization Agents and Auxiliary Materials, 390-402, A.Y. Coran, Vulcanization in Encyclopedia of Polymer Science and Engineering, (2nd Ed. 1989), Frederick R. Erich, Science and Technology of Rubber, Chapter 7, Academic Press (1978), Robert F. Ohm, The Vanderbilt Rubber Handbook, pp. 92-122 (13th Ed. 1990), Krishna C. Baranwal & Howard L. Stephens, Basic Elastomer Technology, Chapter 9, (1st Ed. 2001), and Maurice Morton, Rubber Technology, Chapter 10, (2nd Ed. 1981), which are incorporated herein by reference.

First Carbon Black

In one or more embodiments, the first carbon black, which may also be referred to as a high or medium structure black, may be defined by an iodine absorption number that is greater than 60 g/kg, in other embodiments greater than 70 g/kg, in other embodiments greater than 80 g/kg, and in other embodiments greater than 90 g/kg, as determined according to ASTM D1510. In these or other embodiments, the first carbon black may be defined by an iodine absorption number that is less than 200 g/kg, in other embodiments less than 175 g/kg, and in other embodiments greater than 161 g/kg, as determined according to ASTM D1510. The first carbon black may also be characterized by a dibutylphthalate absorption number, as determined according to ASTM D2414, that varies over a wide range. For example, the dibutylphthalate absorption number may be as low as 70 cc/100 g and increase up to numbers such as 154 cc/100 g. In certain embodiments, the dibutylphthalate absorption number for the first carbon black, as determined by ASTM D2414, may be in excess of 115 cc/100 g. In certain embodiments, the first carbon black may be defined by an iodine absorption number that is greater than 60 g/kg, but less than 110 g/kg, in other embodiments less than 105 g/kg, and in other embodiments less than 100 g/kg, as determined according to ASTM D1510.

In one or more embodiments, the first carbon black may be characterized as an N-300 series or lower carbon black according to ASTM D1765. These carbon blacks may include N-100 series, N-200 series, and N-300 series carbon blacks. Exemplary N-100 series carbon blacks include N-100, N-115, N-120, N-121, N-125, N-134, and N-135 carbon blacks. Exemplary N-200 series carbon blacks may include N-220, N-231, N-294 and N-299. Exemplary N-300 series carbon blacks may include N-326, N-330, N-335, N-343, N-347, N-351, N-356, N-358, and N-375.

In one or more embodiments, the first carbon black, which may also be referred to as medium-sized or small-sized carbon black, may be characterized by a statistical thickness surface area (STSA) of at least 50 $m^2/g$, in other embodiments at least 60 $m^2/g$, in other embodiments at least 70 $m^2/g$, in other embodiments at least 80 $m^2/g$, in other embodiments at least 90 $m^2/g$, and in other embodiments at least 100 $m^2/g$. In these or other embodiments, the first carbon black may be characterized by a statistical thickness surface area (STSA) of from about 55 to about 125 $m^2/g$, in other embodiments from about 60 to about 120 $m^2/g$, in other embodiments from about 70 to about 115 $m^2/g$, and in other embodiments from about 80 to about 100 $m^2/g$.

In these or other embodiments, the first carbon black may be characterized by an average primary particle size of less than 40 nm, in other embodiments less than 35 nm, in other embodiments less than 30 nm, and in other embodiments less than 20 nm. In these or other embodiments, the first carbon black may be characterized by an average primary particle size of from about 11 to about 39 nm, in other embodiments from about 15 to about 35 nm, and in other embodiments from about 20 to about 30 nm.

Second Carbon Black

In one or more embodiments, the second carbon black, which may also be referred to as a low structure black, may be defined by an iodine absorption number that is less than 60 g/kg, in other embodiments less than 55 g/kg, in other embodiments greater than 40 g/kg, and in other embodiments less than 30 g/kg, as determined according to ASTM D1510. In these or other embodiments, the second carbon black may be defined by an iodine absorption number that is greater than 8 g/kg, in other embodiments greater than 10 g/kg, and in other embodiments greater than 20 g/kg, as determined according to ASTM D1510. The second carbon black may also be characterized by a dibutylphthalate absorption number that varies over a wide range. For example, the dibutylphthalate absorption number may be as low as 34 cc/100 g and increase up to numbers such as 180 cc/100 g. In certain embodiments, the dibutylphthalate absorption number for the second carbon black may be less than 115 cc/100 g, and in other embodiments less than 100 cc/100 g.

In one or more embodiments, the second carbon black, which may also be referred to as a low-structure black, may be characterized as an N-400 series or higher carbon black according to ASTM D1765. These carbon blacks may include those selected from the group consisting of N-400 series, N-500 series, N-600 series, N-700 series, N-800 series, and N-900 series carbon blacks. Exemplary N-500 series carbon blacks include N-539, N-550, and N-582 carbon blacks. Exemplary N-600 series carbon blacks may include N-630, N-642, N-650, N-660, and N-683. Exemplary N-700 series carbon blacks may include N-754, N-762, N-765, N-772, N-774, and N-787. Exemplary N-600 series carbon blacks may include N-630, N-642, N-650, N-660, and N-683. Exemplary N-900 series carbon blacks may include N-907, N-908, N-990, and N-991.

In one or more embodiments, the second carbon black, which may also be referred to as a large-sized carbon black, may be characterized by a statistical thickness surface area (STSA) of at most 45 $m^2/g$, in other embodiments at most 40 $m^2/g$, in other embodiments at most 35 $m^2/g$, and in other embodiments at most 33 $m^2/g$. In these or other embodiments, the second carbon black may be characterized by a statistical thickness surface area (STSA) of from about 5 to about 45 $m^2/g$, in other embodiments from about 8 to about 40 $m^2/g$, in other embodiments from about 10 to about 35 $m^2/g$, and in other embodiments from about 15 to about 33 $m^2/g$.

In these or other embodiments, the second carbon black may be characterized by an average primary particle size of greater than 40 nm, in other embodiments greater than 45 nm, in other embodiments greater than 48 nm, and in other embodiments greater than 55 nm. In these or other embodiments, the second carbon black may be characterized by an average primary particle size of from about 40 to about 500 nm, in other embodiments from about 45 to about 200 nm, and in other embodiments from about 48 to about 100 nm.

In one or more embodiments, the iodine absorption number (as determined according to ASTM D1510, of said first carbon black and the iodine absorption number of said second carbon black differ by at least 25 g/kg, in other embodiments by at least 50 g/kg and in other embodiments by at least 75 g/kg.

Clays

Useful clays include mineral clays, which may also be referred to as hydrous aluminum silicates. These clays include kaolin clays and smectite clays. Examples of smectite clays include, montmorillonite, hectorite, nontrite, beidellite, volkonskoite, saponite, sauconite, sobockite, sterensite, and sinfordite clays.

In particular embodiments, the clays are layered clays, which may include a plurality of stacked platelets that may include or be modified to include cationically exchangeable ions between the platelets. Exemplary smectite clays of this nature are known in the art as described in U.S. Pat. Nos. 5,552,469, 6,818,693, and 7,019,063, which are incorporated herein by reference.

In one or more embodiments, the clay filler may be characterized by a particle size of less than 5 μm, in other embodiments less than 2 μm, and in other embodiments less than 1 μm. In these or other embodiments, the clay fillers, particularly the layered clays, may be characterized by an aspect ratio of at least 3, in other embodiments at least 5, and in other embodiments at least 7.

Other Ingredients

Other ingredients that may be employed include accelerators, oils, waxes, scorch inhibiting agents, processing aids, zinc oxide, tackifying resins, reinforcing resins, fatty acids such as stearic acid, peptizers, antiozonants, and one or more additional rubbers.

Amounts

In one or more embodiments, the vulcanizable innerliner compositions include at least 1, in other embodiments at least 5, and in other embodiments at least 10 percent by weight of the rubber component, based upon the entire weight of the composition. In these or other embodiments, the vulcanizable innerliner compositions include at most 25, in other embodiments at most 20, and in other embodiments at most 15 percent by weight of the rubber component based on the entire weight of the composition. In one or more embodiments, the vulcanizable innerliner compositions include from about 1 to about 25, in other embodiments from about 10 to about 20, and in other embodiments from about 20 to about 15 percent by weight of the rubber component based upon the entire weight of the composition.

In one or more embodiments, the vulcanizable innerliner compositions employed in the present invention include both halo-butyl rubber and natural rubber as the rubber component. In one or more embodiments, the weight ratio of halo-butyl rubber to natural rubber may be at least 1:1, in other embodiments at least 2:1, in other embodiments at least 4:1, in other embodiments at least 7:1, in other embodiments at least 8:1, in other embodiments at least 8.5:1, and in other embodiments at least 9.0:1. In these or other embodiments, the weight ratio of halo-butyl rubber to natural rubber may be less than 9.8:1, in other embodiments less than 9.5:1, and in other embodiments less than 9.0:1.

In one or more embodiments, the vulcanizable innerliner compositions include at least 2, in other embodiments at least 5 and in other embodiments at least 10 parts by weight (pbw) of the first carbon black per 100 parts by weight rubber (phr). In these or other embodiments, the vulcanizable innerliner composition includes at most 50, in other embodiments at most 40, and in other embodiments at most 30 pbw of the first carbon black phr. In one or more embodiments, the vulcanizable innerliner composition includes from about 2 to about 50, in other embodiments from about 5 to about 40, and in other embodiments from about 10 to about 30 pbw of the first carbon black phr.

In one or more embodiments, the vulcanizable innerliner compositions include at least 5, in other embodiments at least 15, and in other embodiments at least 20 parts by weight (pbw) of the second carbon black per 100 parts by weight rubber (phr). In these or other embodiments, the vulcanizable innerliner composition includes at most 60, in other embodiments at most 55, and in other embodiments at most 50 pbw of the second carbon black phr. In one or more embodiments, the vulcanizable innerliner composition includes from about 2 to about 60, in other embodiments from about 15 to about 55, and in other embodiments from about 20 to about 50 pbw of the second carbon black phr.

In one or more embodiments, the vulcanizable innerliner compositions include at least 2, in other embodiments at least 5, and in other embodiments at least 10 parts by weight (pbw) of the clay filler per 100 parts by weight rubber (phr). In these or other embodiments, the vulcanizable innerliner composition includes at most 30, in other embodiments at most 25, and in other embodiments at most 20 pbw of the clay filler phr. In one or more embodiments, the vulcanizable innerliner composition includes from about 2 to about 30, in other embodiments from about 5 to about 25, and in other embodiments from about 10 to about 20 pbw of the clay filler phr.

In one or more embodiments, the invention may be described with respect to the total carbon black loading. With respect to the carbon black filler component as a whole, the vulcanizable innerliner composition of one or more embodiments of the present invention may include from about 1 to about 100 parts by weight carbon black per 100 parts by weight rubber, in other embodiments from about 10 to about 85 parts by weight carbon black per 100 parts by weight rubber, and in other embodiments from about 20 to about 80 parts by weight carbon black per 100 parts by weight rubber.

In these or other embodiments, the carbon black filler component of the vulcanizates of the present invention may include a major amount of the second carbon black (i.e., the low structure black). In one or more embodiments, the carbon black filler component includes greater than 50% by weight of the second carbon black, in other embodiments greater than 60% by weight of the second carbon black, and in other embodiments greater than 75% by weight of the second carbon black based on the total weight of the carbon black component. In these or other embodiments, the carbon black component includes less than about 99% by weight, in other embodiments less than about 95% by weight, and in other embodiments less than 90% by weight of the second carbon black based upon the total weight of the carbon black component.

In these or other embodiments, with respect to the first carbon black (i.e., the high structure black), the carbon black filler component of the vulcanizates may include a minor amount of the first carbon black. In one or more embodiments, the carbon black filler component includes less than 50% by weight of the first carbon black, in other embodiments less than 40% by weight of the first carbon black, and in other embodiments less than 25% by weight of the first carbon black based on the total weight of the carbon black component. In these or other embodiments, the carbon black component includes greater than about 1% by weight, in other embodiments greater than about 5% by weight, and in other embodiments greater than 10% by weight of the first carbon black based upon the total weight of the carbon black component.

Method of Preparing Vulcanizable Composition

The compositions of this invention can be prepared by employing conventional formulation techniques. In one or more embodiments, the rubber mixture may be prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients can be added during these remills. Rubber compounding techniques and the additives employed therein are disclosed in Stephens, The Compounding and Vulcanization of Rubber, in Rubber Technology (2nd Ed. 1973).

In one or more embodiments, the vulcanizable composition includes the rubber component serving as a matrix in which the first carbon black, the second carbon black, and optional clay filler are dispersed.

Method of Preparing a Tire

Practice of the present invention does not necessarily alter the methods by which tires can be constructed according to the present invention. For example, Pneumatic tires can be made as discussed in U.S. Pat. Nos. 5,866,171, 5,876,527, 5,931,211, and 5,971,046, which are incorporated herein by reference.

In one or more embodiments, the innerliner may be prepared by conventional calendering or milling techniques to form a strip of uncured compounded rubber of appropriate width. This uncured compound may be referred to as a gum strip. The gum strip may be the first element of the tire applied to a tire building drum, over and around which the remainder of the tire is built. In other embodiments, the innerliner may be incorporated into a subassembly with another tire component before placing it on the drum. For example, the gum strip (i.e., innerliner) may be laminated to the body ply (i.e., carcass) prior to placement on the drum. When the tire is cured, the innerliner may become an integral, co-cured, part of the tire. Tire innerliners and their methods of preparation are well known to those having skill in the art.

In one or more embodiments, a vulcanizable innerliner composition may be formed into a layer or sheet. As known to those skilled in the art, the layer may be produced by a press or passing a rubber composition through a mill, calender, multihead extruder or other suitable means. In one or more embodiments, the layer is produced by a calender. The uncured layer sheet may then be constructed as an inner surface of an uncured rubber tire structure, which may be referred to as a carcass.

In one or more embodiments, the uncured layer may be co-cured with the tire carcass, as well as with the other components of the tire, during the tire curing operation under conditions of heat and pressure. In one or more embodiments, vulcanization of the tire containing the innerliner of the present invention may be carried out at temperatures of from about 100° C. to about 200° C. In one embodiment, the vulcanization is conducted at temperatures ranging from about 110° C. to about 180° C. Any vulcanization process known in the art may be used, including heating in a press or mold, heating with superheated steam or hot salt, or in a salt bath. In one embodiment, the heating is accomplished in a press or mold. The conditions of cure can be readily selected by those of skill in the art to achieve appropriate cure of the various tire components.

In one or more embodiments, the vulcanized innerliner becomes an integral part of the tire by being co-cured therewith. In one or more embodiments, the innerliner is at least partially cured to and is thereby adhered to the adjacent tire component (e.g., carcass) to an extent that the resulting laminate passes industry standards for adhesion such as may be determined by blow point analysis. In one or more embodiments, the cured innerliner includes a vulcanized rubber in which the first carbon black, the second carbon black, and optional clay fillers are dispersed. In one or more embodiments, the first carbon black, the second carbon black, and the optional clay filler are dispersed in the rubber component in amounts as provided for in the vulcanizable composition set forth above.

In one or more embodiments, the cured innerliner has a thickness ranging from about 0.02 to about 0.35 centimeters. In another embodiment, the cured innerliner has a thickness of from about 0.04 to about 0.15 cm thickness In one or more embodiments, the pneumatic tire with the integral innerliner may be constructed in the form of a passenger tire, truck tire or other type of bias or radial pneumatic tire.

In one or more embodiments, tire innerliners prepared according to the method of the present invention have a good combination of properties including air permeability, flex resistance, tensile strength and adhesion.

In order to demonstrate the practice of the present invention, the following examples have been prepared and tested. The examples should not, however, be viewed as limiting the scope of the invention. The claims will serve to define the invention.

Various modifications and alterations that do not depart from the scope and spirit of this invention will become apparent to those skilled in the art. This invention is not to be duly limited to the illustrative embodiments set forth herein.

What is claimed is:

1. A method of preparing a green tire innerliner, the method comprising:
mixing at least one vulcanizable elastomer selected from the group consisting of butyl rubber, halobutyl rubber, and combinations thereof, natural rubber, a curative, a first carbon black having a statistical thickness surface area of at least 50 m$^2$/g, and a second carbon black having a statistical thickness surface area of at most 45 m$^2$/g to form a vulcanizable composition of matter; and
extruding the vulcanizable composition of matter to form a green tire innerliner having an uncured gum thickness of from about 0.08 cm to about 0.5 cm.

2. The method of claim 1, where the vulcanizable composition of matter further includes clay.

3. The method of claim 2, where the clay is a layered clay.

4. The method of claim 2, where the clay is selected from the group consisting of montmorillonite, hectorite, nontrite, beidellite, volkonskoite, saponite, sauconite, sobckite, sterensite, and sinfordite.

5. The method of claim 1, where the innerliner includes from about 2 to about 50 parts by weight of the first carbon black per 100 parts by weight rubber, and includes from about 5 to about 60 parts by weight of the second carbon black per 100 parts by weight rubber.

6. The method of claim 1, wherein the innerliner includes from about 5 to about 40 parts by weight of the first carbon black per 100 parts by weight rubber, and includes from about 15 to about 55 parts by weight of the second carbon black per 100 parts by weight rubber.

7. The method of claim 1, further comprising the step of building a tire by employing the green tire innerliner.

8. The method of claim 7, further comprising the step of curing the tire, including the innerliner.

9. The method of claim 1, where the green tire innerliner has an uncured gum thickness of less than 0.26 cm.

10. The method of claim 1, where the second carbon black is selected from the group consisting of N-600 series, N-700 series, N-800 series, and N-900 series carbon blacks.

11. A method of preparing a green tire innerliner, the method comprising:
mixing at least one vulcanizable elastomer selected from the group consisting of butyl rubber, halobutyl rubber, and combinations thereof, natural rubber, a curative, a first carbon black having an average particle size of less than 40 nm, and a second carbon black having an average particle size of greater than 48 nm to form a vulcanizable composition of matter; and
extruding the vulcanizable composition of matter to form a green tire innerliner having an uncured gum thickness of from about 0.08 cm to about 0.5 cm.

12. The method of claim 11, further comprising the step of building a green tire by employing the green tire innerliner.

13. The method of claim 12, further comprising the step of curing the green tire.

14. The method of claim 11, where the green tire innerliner has an uncured gum thickness of less than 0.26 cm.

15. The method of claim 11, where the vulcanizable composition of matter further includes clay.

* * * * *